United States Patent [19]

Matsuyama

[11] 4,347,579

[45] Aug. 31, 1982

[54] ELECTRONIC INSTRUMENT HAVING AN OPERATION COUNT FUNCTION

[75] Inventor: Shigeru Matsuyama, Tokyo, Japan

[73] Assignee: Canon Kabushiki Kaisha, Tokyo, Japan

[21] Appl. No.: 125,579

[22] Filed: Feb. 28, 1980

[30] Foreign Application Priority Data

Mar. 3, 1979 [JP] Japan ................................ 54-24051

[51] Int. Cl.³ ............................................ G06F 13/00
[52] U.S. Cl. ...................... 364/709; 364/200; 364/715; 235/92 CP
[58] Field of Search ............... 364/709, 710, 715, 900; 235/92 CP

[56] References Cited

U.S. PATENT DOCUMENTS

| | | | |
|---|---|---|---|
| 3,911,424 | 10/1975 | Giannuzzi et al. | 364/709 X |
| 3,983,380 | 9/1976 | Sharif et al. | 364/710 |
| 4,041,291 | 8/1977 | Pavda | 235/92 CP X |
| 4,048,484 | 9/1977 | Brittan | 364/709 X |
| 4,118,783 | 10/1978 | Collins | 364/709 X |
| 4,138,734 | 2/1979 | Nakata et al. | 364/710 |
| 4,164,038 | 8/1979 | Nachtigal | 235/92 CP X |
| 4,177,520 | 12/1979 | Meff | 364/710 X |

Primary Examiner—David H. Malzahn
Attorney, Agent, or Firm—Fitzpatrick, Cella, Harper & Scinto

[57] ABSTRACT

An electronic instrument having an operation count function for executing addition and subtraction. This instrument is provided with an item count register for storing the number of times of the operation of an addition instructing key or a subtraction instructing key, a total register for storing the result of the addition or the subtraction by the operation of said keys, a key for causing the content of said item count register and the content of said total register to be saved into other registers which are not used for the operation, and a key for causing said saved contents to be returned to said item count register and said total register, respectively.

9 Claims, 1 Drawing Figure

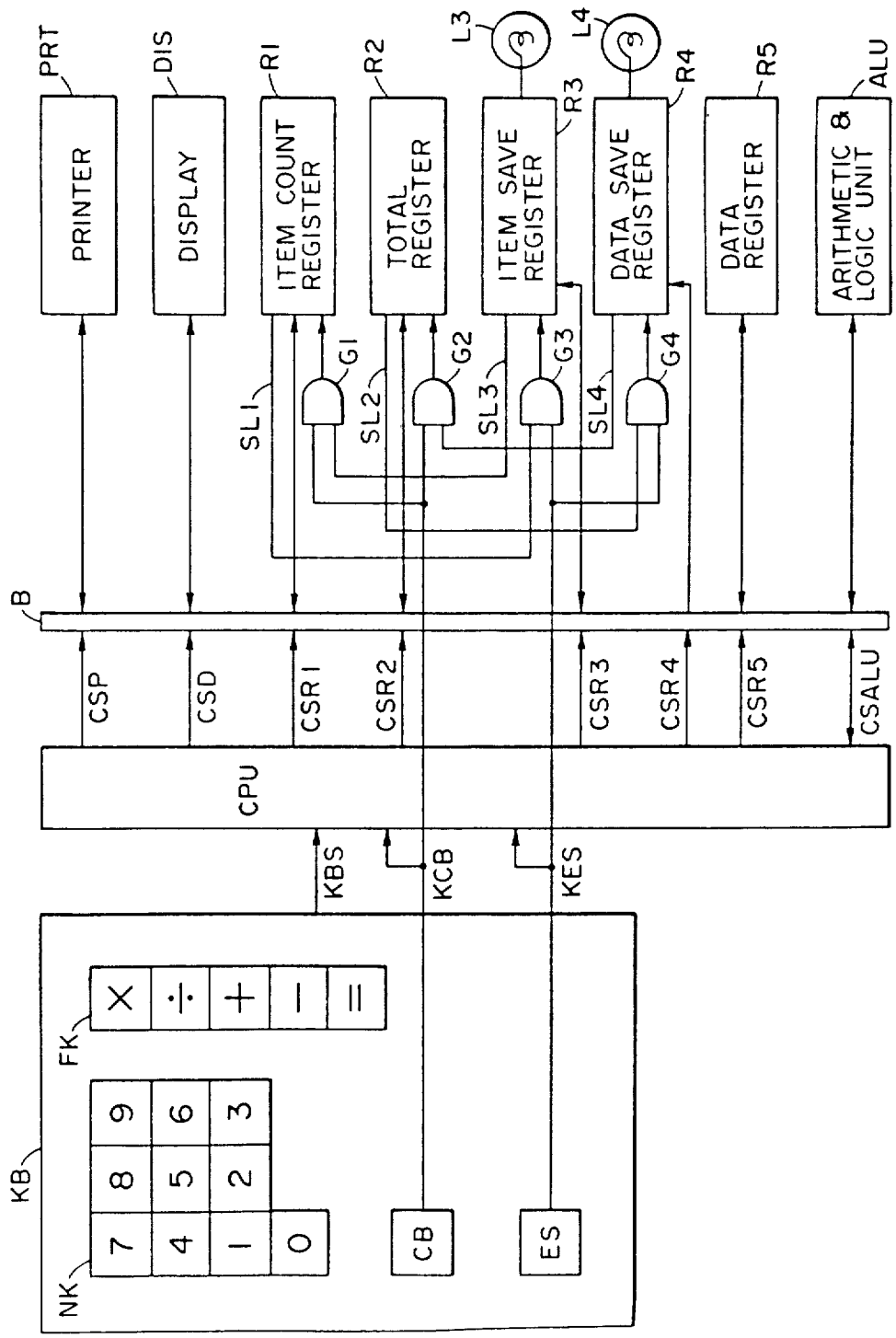

4,347,579

ELECTRONIC INSTRUMENT HAVING AN OPERATION COUNT FUNCTION

BACKGROUND OF THE INVENTION

1. Field of the Invention

This invention relates to an electronic instrument having an operation count function.

2. Description of the Prior Art

With a conventional electronic instrument, for example, a conventional electronic desk-top calculator. There has often been the case that when the work of addition or subtraction was interrupted by other urgent work, it is difficult to find from where the calculation should be resumed after the termination of the urgent work, particularly in a case where there is a number of similar digits in succession.

Also, when a person who has so far used a calculator has been forced to interrupt the calculation work by some other urgent work and if another person wants to use the same calculator for another calculation, the calculation so far carried out by the first-named person must be cleared and accordingly, after the termination of the urgent work, the first-named person must resume the calculation from the first.

SUMMARY OF THE INVENTION

It is an object of the present invention to provide an electronic instrument having an operation count function which eliminates the above-noted disadvantages peculiar to the prior art.

It is a further object of the present invention to provide an electronic instrument having an operation count function which is easy to operate.

It is still a further object of the present invention to provide an electronic instrument having an operation count function which enables the interrupted place of an operation to be readily recognized.

It is yet still a further object of the present invention to provide an electronic instrument having an operation count function which, even if an operation is interrupted, enables other operation to be carried out and after the termination of said other operation, enables the interrupted operation to be resumed.

It is a further object of the present invention to provide an electronic instrument having an operation count function which enables easy recognition of how far an operation has been carried out.

The invention will become fully apparent from the following detailed description thereof taken in conjunction with the accompanying drawing.

BRIEF DESCRIPTION OF THE DRAWING

The drawing is a block diagram showing an example of the circuit construction in an electronic calculator embodying the present invention.

DESCRIPTION OF THE PREFERRED EMBODIMENT

The drawing shows the circuit construction of an electronic desk-top calculator embodying the present invention. On a keyboard KB shown in the left portion of the drawing, there are provided a numeric key group NK comprising numeric keys for entering digits 0–9, a function key group FK comprising an addition key + for instructing the addition operation, a subtraction key − for instructing the subtraction operation, a multiplication key × for instructing the multiplication operation, a division key ÷ for instructing the division operation and an equal key = for instructing the execution of the operations, a save instructing key ES for causing the content of an item count register R1, to be described, for storing the number of times that the addition key or the subtraction key has been operated and the content of a total register R2, to be described, for storing the result of the operation to be saved into other registers R3 and R4 which are not used for the operation, and a return key CB for causing the saved contents of the item count register and the total register to be returned to the registers R1 and R2, respectively. When the numeric key group NK and function key group FK provided on the keyboard KB are operated, the contents thereof are delivered to a control unit CPU as keyboard signals KBS corresponding to the respective keys, and when the CB key and the ES key are operated, the contents thereof are delivered to the control unit CPU as keyboard signals KCB and KES. The control unit CPU receives the signals KBS, KCB and KES from the keyboard KB and the signals from other circuits and delivers a display device control signal CSD, register control signals CSR1–CSR5 and an arithmetic and logic unit control signal CSALU to various devices to be described, namely, a display device DIS, a printer PRT, registers R1–R5 and an arithmetic and logic unit ALU, to thereby effect the control. A bus line B transmits said various control signals to the devices to which the respective signals are directed, and further effects the transfer of the signals between the various devices connected to the bus line B, under the control of the control unit CPU. The registers R1–R5 are, for example, 4-bit parallel registers. The register R1 is an item count register for totalling the nubmer of times that the + key and the − key have been depressed, and the register R2 is a total register for storing the result of the operation therein. The contents of these registers R1 and R2 are displayed by the display device DIS. The register R3 is an item save register into which the content of the register R1 is saved, the register R4 is a data save register into which the content of the register R2 is saved, and the register R5 is an input digit data register for storing therein the input digits entered from the numeric key group NK. Lamps L3 and L4 adapted to be turned on when digit information is stored in the registers R3 and R4 and to be turned off when these registers are empty are attached to the registers R3 and R4. The item count register R1, the total register R2 and the data register R5 are connected to the display device DIS and the printer PRT, so that the operator of the calculator can know the contents of the respective registers through the display device DIS or the printer PRT. ALU is an arithmetic and logic unit which receives the control signal CSALU from the control unit CP and effects treatments such as addition and subtraction on the data delivered through the bus line B.

In the electronic calculator of the above-described construction, the operations of the other elements than the keys ES, CB and the registers R3, R4 are the same as those in the conventional electronic calculator and therefor, they need not be described in detail. Designated by G1–G4 are AND gates. By depressing the save key ES, the gates G3 and G4 are opened to permit the content of the register R1 to be transferred to the register R3 by a signal line SL1 and to permit the content of the register R2 to be transferred to the register R4 by a signal line SL2. Simultaneously therewith, signal KES instructs the printer PRT to print the contents of the registers R1 and R2. Even if the data in the registers R1 and R2 are thus saved into the registers R3 and R4, the data in the registers R1 and R2 are not cancelled but remain unchanged and therefore, on the display device DIS, the contents of the registers R1 and R2 are displayed as they are.

Conversely, when the return key CB is depressed to put out a return instruction, the AND gates G1 and G2 are opened to permit the content of the register R3 to be transferred to the register R1 by a signal line SL3 and to permit the content of the register R4 to be transferred to the register R2 by a signal line SL4.

In the electronic calculator of such construction, the digit input by the key group NK is once stored in the register R5 and displayed on the display device DIS. Further, when addition or subtraction operation is executed by the + key or the − key of the key group FK, said digit input is printed on recording paper by the printer PRT, and the number of times of depression of the + key or the − key is stored in the register R1 and moreover, the result of the operation is stored in the register R2 and displayed on the display device DIS. Thus, if there occurs a circumstance that the user must unavoidably permit other calculation to thrust into the calculator due to some urgent work or must unavoidably move away from the calculator in the course of calculation, the user depresses the save key ES. Thereby, the contents of the registers R1 and R2 are caused to be saved into the same registers R3 and R4, respectively, and the lamps L3 and L4 are turned on and further, the contents of the registers R1 and R2 are printed on the recording paper by the printer PRT. Accordingly, it can be known that the calculator is in the course of calculation and the data have been saved, and thus the electronic calculator can be used for other calculation. Further, when the interrupted operation is to be resumed, the return key CB may be depressed, whereby the contents of the registers R3 and R4 are again stored in the registers R1 and R2 enable the calculation to be continued. In that case, the contents of the registers R1 and R2 can be displayed on the display device DIS and so, the user can know where the calculation has been interrupted and in this sense, such calculator is convenient to use. Also, the user can confirm, by means of the lamps L3 and L4, whether or not the contents of the registers R1 and R2 have been saved.

The above-described operation will be specifically explained by taking as an example the operation of "110+120+ ES ... CS ". When "110" is entered by the numeric key group NK, the content "110" of the register R5 is displayed by the display device DIS. Next, when the addition key + is depressed, the content "110" of the register R2 and the content "1" of the register R1 are displayed on the display device, and "110+" which is the digit data in the register R5 is printed by the printer PRT. Next, when "120" is entered by the numeric key group NK, the content "120" of the register R5 is displayed by the display device DIS. Next, when the addition key + is depressed, "230" which is the result of the addition and which is the content of the register R2 and the content "2" of the register R1 are displayed on the display device DIS, and the printer PRT prints "120" which is the input digit data in the register R5. In such condition, when the necessity of interrupting the operation occurs and the save key ES is depressed, the contents of the registers R1 and R2 are transferred to the registers R3 and R4 and the printer PRT prints the contents of the registers R1 and R2, i.e. "2" and "230". The lamps L1 and L2 are turned on, but as already described, the contents of the registers R1 and R2 remain unchanged even after they have been transferred and therefore, the display device DIS still displays the item count "2" and the result of the operation "230".

During such interruption, when another person wants to use the calculator for other calculation, said another person may depress a clear key, not shown, to clear the contents of the registers R1 and R2, whereafter said another person may carry out an operation as usual.

When it is desired to resume the interrupted operation, the return key CB may be depressed to cause the saved data "2" and "230" to be stored in the registers R1 and R2, respectively, whereupon the display device displays "2" and "230". Accordingly, where the calculation has been interrupted can be confirmed from such display or said print and therefore, the operation after interrupted can be continued.

What I claim:

1. An electronic instrument having an operation count function, comprising:

data input means for entering data into said instrument to be operated on;

operation instructing means for generating processing instruction signals;

data processing means connected to said data input means and said operation instructing means and responsive to a processing instruction signal generated by said operation instructing means for processing the data entered by said data input means to obtain a result;

first storage means connected to said data processing means and said operation instructing means and responsive to the result obtained by said data processing means and each processing instruction signal generated by said operation instructing means for storing the result and the number of times a processing instruction signal has been generated;

second storage means for storing the result and the number of times a processing instruction signal has been generated stored in said first storing means;

data transmission means connected between said first storage means and said second storage means to transmit data therebetween;

first instruction control key means connected to said data transmission means for controlling said data transmission means to transmit the same data as that stored in said first storage means to said second storage means for storage therein, said first instruction control key means being operable in the event of an interruption of a series of operations by said data processing means each initiated by each said processing signal, wherein operation of said first instruction control key means causes said first and said second storage means to store the same data; and second instruction control key means connected to said data transmission means for controlling said data transmission means to transmit the data stored in said second storage means to said first storage means for storage therein, said second instruction control key means being operable in order to resume the interrupted series of operations, whereby if the data stored in said first storage means is destroyed during the period of interruption, the operation of said second instruction control key means will restore said data to said first storage means from said second storage means.

2. An electronic instrument having an operation count function according to claim 1 further comprising informing means connected to said second storage means for informing that the data stored in said first storage means is also stored in said second storage means.

3. An electronic instrument having an operation count function according to claim 1 further comprising display means connected to said first storage means for displaying the data stored in said first storage means.

4. An electronic instrument having an operation count function according to claim 1 wherein said operation instructing means includes an addition key for instructing an addition, and a subtraction key for instructing a subtraction.

5. An electronic instrument having an operation count function, comprising:
- operation processing means for processing data entered into said instrument in accordance with an operation instruction also entered thereinto to obtain a result;
- first storage means connected to said operation processing means for storing the result obtained by said operation processing means and the number of times data processing has occurred in accordance with an operation instruction;
- second storage means for storing the result stored in said first storage means and the number of times data processing has occurred, in accordance with an operation instruction, stored in said first storage means;
- data transmission means connected between said first storage means and second storage means to transmit data therebetween;
- first instruction control key means connected to said data transmission means for controlling said data transmission means to transmit the same data stored in said first storage means to said second storage means for storage therein, said first instruction control key means being operable when a series of data processing operations each initiated in accordance with an operation instruction is interrupted, wherein the operation of said first instruction control key means causes said first and second storage means to store the same data;
- informing means connected to said second storage means for informing that the data stored in said first storage means have been transmitted to and are stored in said second storage means; and
- second instruction control key means connected to said data transmission means for controlling said data transmission means to transmit the data stored in said second storage means to said first storage means, said second instruction control key means being operable when the interrupted series of data processing operations is resumed, whereby if the data stored in said first storage means is destroyed during the period of interruption, the data in said first storage means is restored from said second storage means through said data transmission means by operation of said second instruction control key means.

6. An electronic instrument having an operation count function according to claim 5 wherein said informing means comprises an optical display.

7. An electronic instrument having an operation count function according to claim 5 wherein said second storage means has a first memory location for storing the data representing the result and a second memory location for storing the data presenting the number of times data processing operations have occurred, and said second memory locations of said second storage means are each provided with information means associated respectively therewith.

8. An electronic instrument having an operation count function, comprising:
- operation processing means for processing data entered into said instrument in accordance with an operation instruction also entered thereinto to obtain a result;
- first storage means connected to said operation processing means for storing the results obtained by said operation processing means and the number of times data processing has occurred in accordance with an operation instruction;
- second storage means for storing the result stored in said first storage means and the number of times data processing has occurred, in accordance with an operation instruction, stored in said first storage means;
- data transmission means connected between said first storage means and said second storage means to transmit data therebetween;
- printing means connected to said first storage means for printing data representative of the result and of the number of times data processing has occurred;
- first instruction means connected to said data transmission means and said printing means to control said data transmission means to transmit the same data stored in said first storage means to said second storage means, said first instruction means being operable when a series of data processing operations each initiated in accordance with an operation instruction is interrupted, said first instruction means also controlling said printing means to print out the result and the number of times data processing operations have occurred; and
- second instruction means connected to said data transmission means for controlling said data transmission means to transmit the data stored in said second storage means to said first storage means, said second instruction means being operable when the interrupted series of data processing operations is resumed.

9. An electronic instrument having an operation count function according to claim 8 further comprising display means for displaying the content of said first storage means.

* * * * *

UNITED STATES PATENT AND TRADEMARK OFFICE
CERTIFICATE OF CORRECTION

PATENT NO. : 4,347,579

DATED : August 31, 1982

INVENTOR(S) : SHIGERU MATSUYAMA.

It is certified that error appears in the above-identified patent and that said Letters Patent is hereby corrected as shown below:

Column 6, line 11
(Claim 7, line 5)

Change "presenting" to --representing--.

Column 6, line 13
(Claim 7, line 7)

Delete "second", first occurrence.

Signed and Sealed this

Twenty-second Day of February 1983

[SEAL]

Attest:

Attesting Officer

GERALD J. MOSSINGHOFF

Commissioner of Patents and Trademarks